United States Patent [19]

Oyama et al.

[11] Patent Number: 5,263,065
[45] Date of Patent: Nov. 16, 1993

[54] APPARATUS FOR HOLDING GRID SPRINGS

[75] Inventors: Junichi Oyama; Taichi Koiwai; Shuji Yamazaki, all of Ibaraki, Japan

[73] Assignee: Mitsubishi Nuclear Fuel Co., Tokyo, Japan

[21] Appl. No.: 996,021

[22] Filed: Dec. 23, 1992

[30] Foreign Application Priority Data

Dec. 24, 1991 [JP] Japan .................. 3-341542

[51] Int. Cl.⁵ .............................. G21C 3/334
[52] U.S. Cl. .................................... 376/261
[58] Field of Search ............. 376/261, 260; 29/723, 29/906

[56] References Cited

U.S. PATENT DOCUMENTS

| | | | |
|---|---|---|---|
| 4,175,000 | 11/1979 | Jabsen | 376/446 |
| 4,427,622 | 1/1984 | Knecht et al. | 376/260 |
| 4,651,403 | 3/1987 | DeMario et al. | 376/261 |
| 5,061,437 | 10/1991 | Whitt | 376/261 |
| 5,068,081 | 11/1991 | Oyama et al. | 376/261 |

FOREIGN PATENT DOCUMENTS 0302282 2/1989 European Pat. Off. .

OTHER PUBLICATIONS

Patent Abstracts of Japan vol. 014, No. 452 (P-112) Sep. 1990 and JP-A-02 181 699 (Mitsubishi Nuclear Fuel Co Ltd) 16 Jul. 1990.
Atomkernenergie/Kerntechnik vol. 47, No. 1, Jul. 1985, Munchen De p. 39; FIG. 4.

Primary Examiner—Daniel D. Wasil
Attorney, Agent, or Firm—Oblon, Spivak, McClelland, Maier & Neustadt

[57] ABSTRACT

The purpose of the present invention is to provide an apparatus which can insert a plurality of hooks into slits of a strap constructing a grid and to hold springs so that the spaces of grid cells are enlarged simultaneously. The enlargement enables insertion of fuel rods into the cells. The apparatus comprises a frame member adapted to attach to the strap along the longitudinal direction thereof, a pair of clamping members engaged the frame member and extending in the longitudinal direction of the strap. Each clamping member can move along the longitudinal direction of the strap. The clamping member has a plurality of projecting hooks arranged in the longitudinal direction of the strap in a spaced relation to one another. The end of the hooks of one of the clamping means are bent toward a longitudinal direction of the strap, while the hooks of another clamping means are bent toward another longitudinal direction of the strap.

10 Claims, 16 Drawing Sheets

APPARATUS FOR HOLDING GRID SPRINGS

BACKGROUND OF THE INVENTION

The present invention relates to an apparatus for holding grid springs, enabling quick insertion of fuel rods into grid cells of a fuel assembly.

In general, in a pressurized water reactor, a fuel assembly is used. The fuel assembly comprises numerous elongated fuel rods arranged in parallel, predeterminedly spaced in relation to one another. The fuel assembly consists of a top nozzle and a bottom nozzle arranged in a spaced relation, a plurality of grids assembled with a plurality of straps and arranged in a spaced relation to one another between the nozzles, control-guide pipes and measuring-instrument guide pipes passing through grid cells of the grids, and numerous fuel rods passing through the grid cells and elastically supported by a spring formed in each grid.

In the foregoing, in assembling a fuel assembly such as the above, when the fuel rod is just inserted in the grid cell of the grid without any supplementary care, the fuel rod contacts the spring and a dimple which is formed on the strap to support the fuel rod. The contact of the fuel rod with the spring and the dimple results in the occurrence of scratching on the peripheral outer surface of the fuel rod or damage to the grid. Therefore, up to now, a number of countermeasures have been suggested to overcome the above problems. As an example of a countermeasure to prevent occurrence of scratching, a grid having an opening for inserting a key is disclosed in Japanese Patent First Publication No. Hei 2-181699. In the apparatus, the fuel rod is inserted in the grid in such a way that a bar-shaped long key is inserted in a row of grid cells through the opening from the outside, then springs are pressed and reflected by the key. In such a fuel assembly, since the space of the grid cell can be enlarged to be greater than the diameter of the fuel rod, the fuel rod can be smoothly inserted without scratching on the peripheral outer surface of the fuel rod.

However, in the grid adapted to insert the key, the operations for inserting the key in a row of grid cells and pressing the springs are very complicated, and hence, a large amount of time is required to operate the enlargement for numerous grids. Therefore, a new solution in which springs can be easily and quickly reflected, so that numerous grid cells can be enlarged, is desired.

SUMMARY OF THE INVENTION

It is therefore an objective of the present invention to provide an apparatus for holding grid springs, which can reflect and hold springs formed on straps constructing a grid; specifically, springs formed on straps constructing grid cells at a peripheral portion of the grid, so that operation for inserting fuel rods can be easily carried out.

In order to solve the above problems, the present invention provides an apparatus for holding springs of a grid of a fuel assembly for pressing and holding a springs of a grid constructed with a plurality of straps in the form of elongated sheets and having pairs of slits extending in the widthwise direction of the strap and a spring formed between a pair of the slits, a plurality of the slits and the springs being arranged continuously in the longitudinal direction of the strap. The apparatus of the present invention comprises a frame member adapted to be attached to the strap along the longitudinal direction thereof, and a pair of clamping members engaged the frame member and extending in the longitudinal direction of the strap. Each clamping member can move along the longitudinal direction of the strap. The clamping member has a plurality of projecting hooks arranged in the longitudinal direction of the strap in a spaced relation. The hooks provided to one of the clamping members have ends respectively, and the ends are bent in a longitudinal direction of the strap. On the other hand, the hooks provided to another clamping member have ends, and the ends are bent in another longitudinal direction of the strap.

The apparatus optionally comprises at least a lifting means for relatively moving the clamping members with respect to the frame member in a direction away from and toward the strap.

In the present invention constructed as above, the frame member is attached to the strap constructing a peripheral surface of the grid, in a condition in which the projecting hooks provided to a pair of the clamping members are inserted in the slits of the strap, and then the clamping members are moved in opposite directions to each other. For this operation, a pair of the hooks move into proximity with each other, so that the springs are held by the hooks from both sides thereof, and the spring is supported by the clamping members.

Moreover, when the apparatus comprises at least a lifting means for relatively moving the clamping members with respect to the frame member in a direction away from and toward the strap, by operating the lifting member in a condition in which the frame member is attached to a strap, and the hooks holding the springs of the strap move toward the outside of the grid, so that the springs are pressed and the spaces of the grid cells are enlarged.

DETAILED DESCRIPTION OF THE INVENTION

With reference to the accompanying drawings, an embodiment of an apparatus for supporting springs of a grid of the present invention will be explained.

Figure 16:
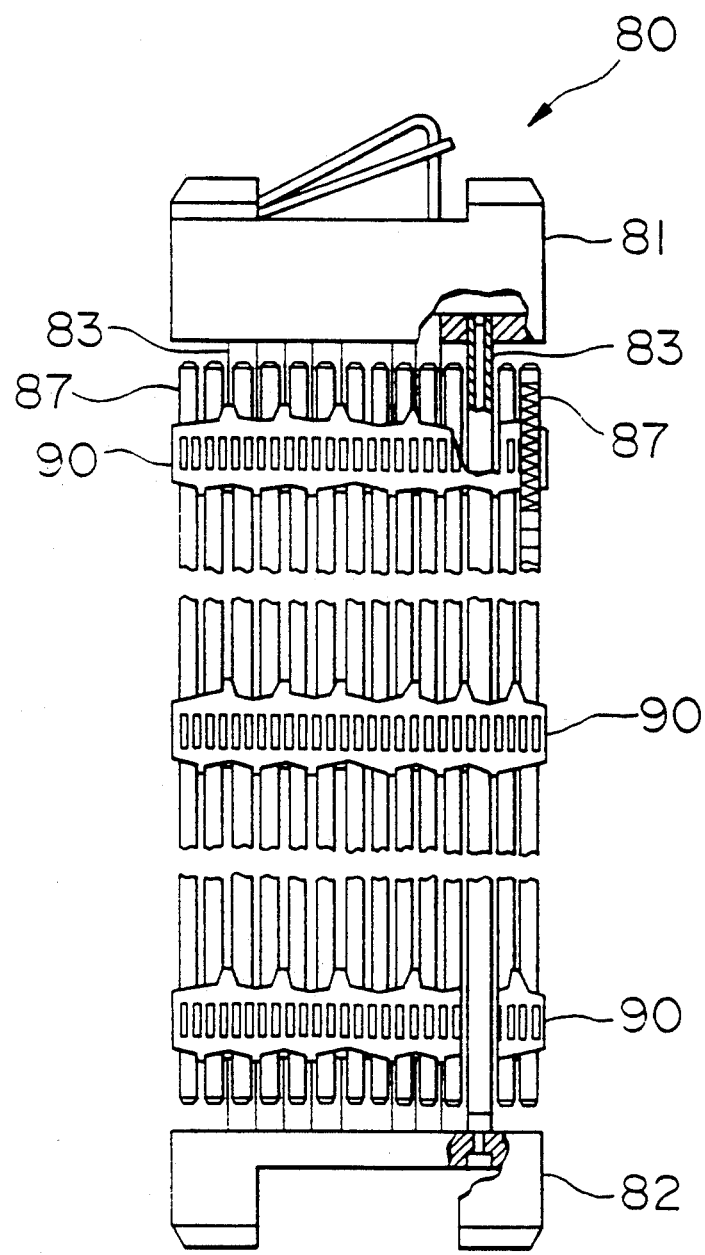
FIG. 16 is a side view of a fuel assembly including grids.

FIG. 16 shows an example of a fuel assembly. In the fuel assembly 80, a plurality of control-rod guide pipes 83 are extended between a top nozzle 81 and a bottom nozzle 82 and securely fixed thereto. A plurality of grids 90 are secured to intermediate portions of the control-rod guide pipe 83 in vertically spaced relation to each other. Numerous fuel rods 87 are supported in the grids 90.

Figure 15:
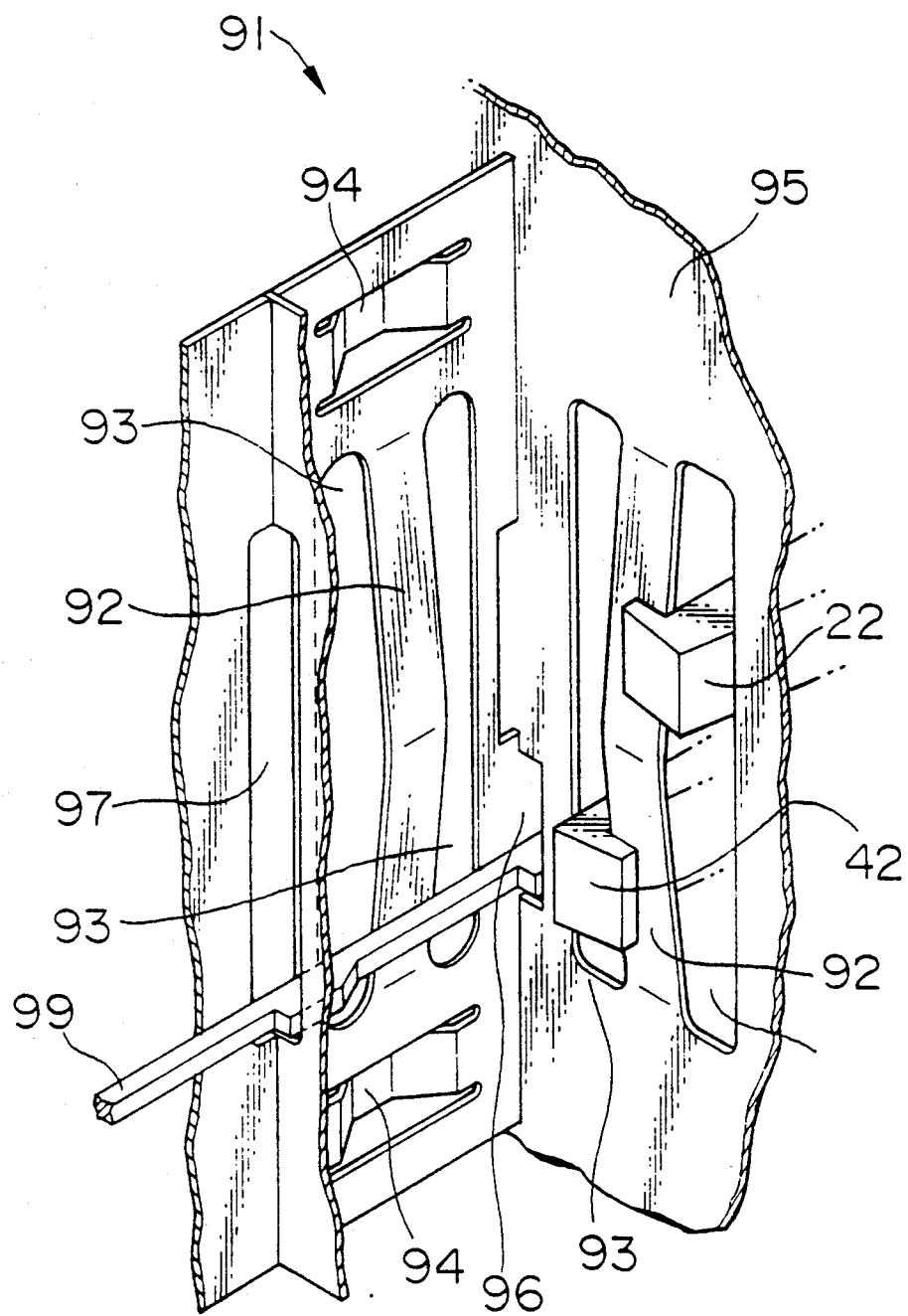
FIG. 15 is a perspective view showing the straps and a hook engaging the straps.

As shown in FIG. 15, the grid 90 is constructed with a plurality of inner straps 91 and outer straps 95 which are in the form of elongated sheets and are assembled in the shape of a lattice. The inner strap 91 and outer strap 95 are respectively formed with many pairs of slits 93 extending in the widthwise direction of the straps 91 and 95. A spring 92 projecting toward the inside of the grid cell from the one face of the inner strap 91 or the outer strap 95 is formed between a pair of the slits 93. Thus, a plurality of the slits 93 and the spring 92 are arranged in the longitudinal direction of the inner strap 91 and the outer strap 95. Numeral 94 indicates a dimple which is formed on the inner strap 91 and projects in the direction counter to the direction of projection of the spring 92.

For this construction, the spring 92 and the dimple 94 are facing toward each other in each grid cell of the grid 90, so that the spring 92 pushes and supports the fuel rod 87 cooperating with the dimple 94. In the following explanation, as a matter of convenience, the longitudinal direction of the inner strap 91 and the outer strap 95 is the horizontal direction (the right and left direction) in FIG. 16, and the widthwise direction thereof is the direction for inserting the fuel rod 87 (the vertical direction in FIG. 16).

Figure 1:
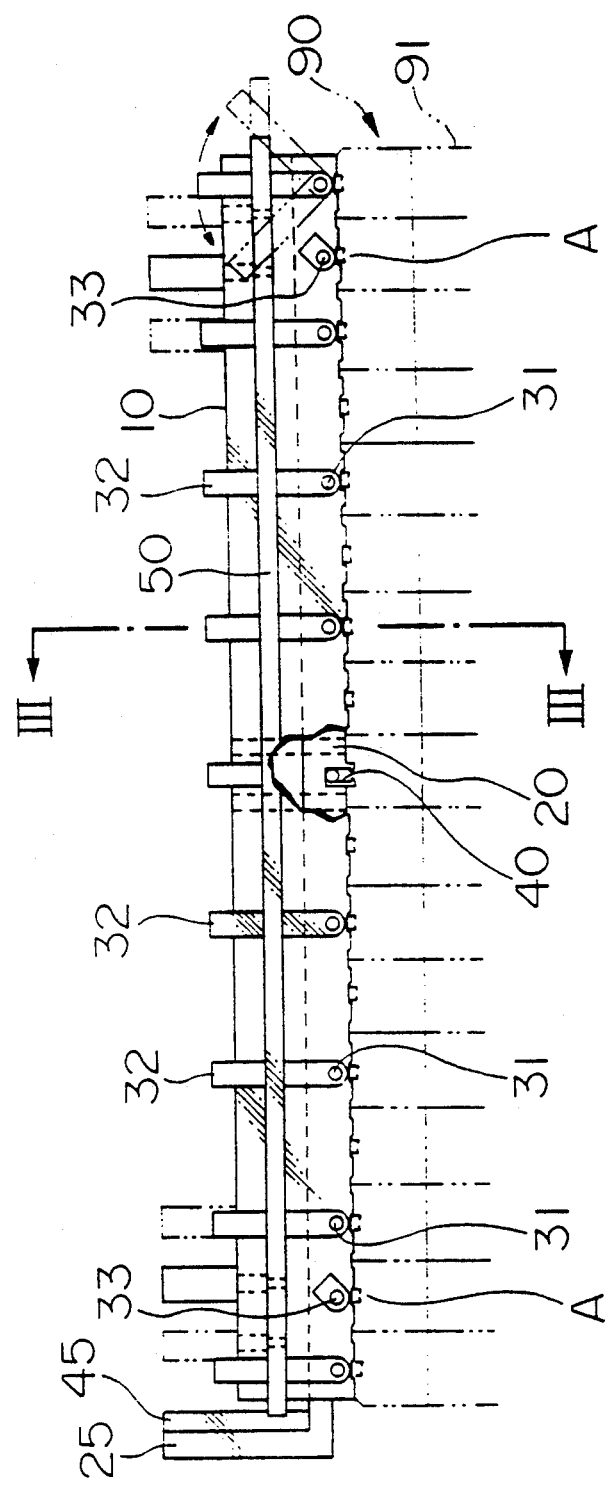
FIG. 1 is a plan view of a first embodiment of an apparatus for supporting springs of a grid.
Figure 2:
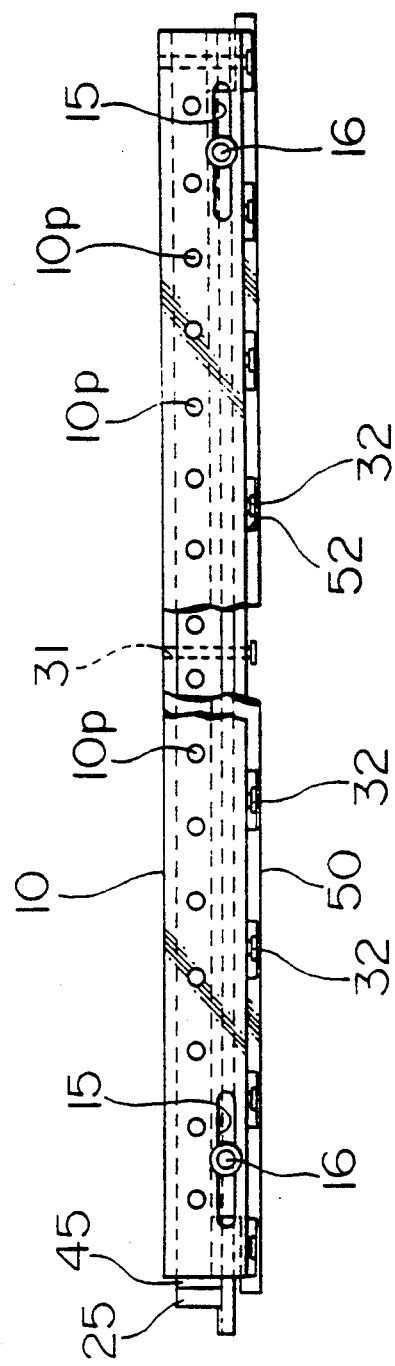
FIG. 2 is a rear view of the first embodiment of an apparatus for supporting springs of a grid.
Figure 3:
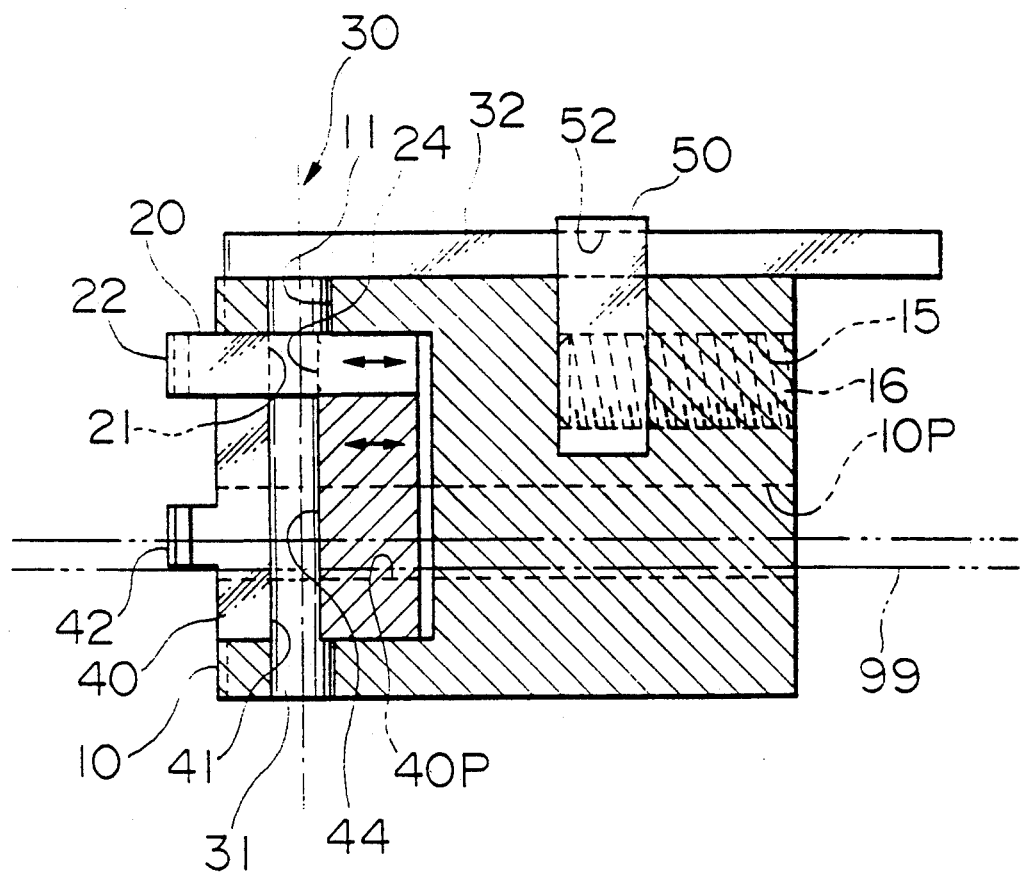
FIG. 3 is a view as seen from the arrows III—III in FIG. 1.

FIGS. 1 through 6 show a first embodiment of the apparatus. The apparatus is directed to press and hold the spring 92 of the outer strap 95 disposed at a peripheral portion of the grid 90 constructed as above, and the plane configuration thereof is shown in FIG. 1 and the view as viewed from the arrows III—III is shown in FIG. 3. The apparatus comprises a frame member 10 adapted to be attached to the outer strap 95 along the longitudinal direction thereof, and a pair of clamping members 20 and 40 which engage the frame member 10. The clamping members 20 and 40 extend along the longitudinal direction and are designed to move in the longitudinal direction thereof.

Figure 4:
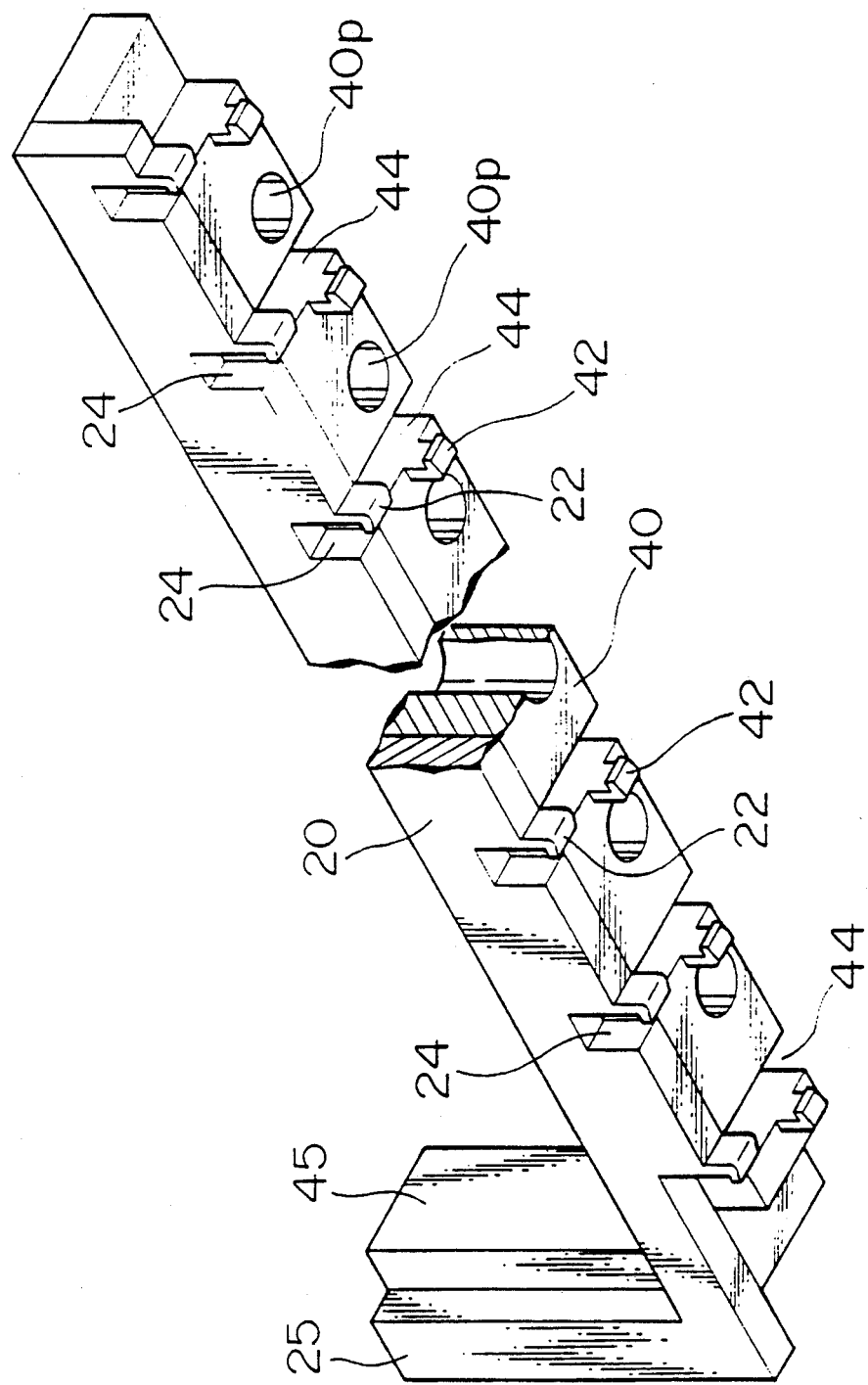
FIG. 4 is a perspective view of a pair of clamping members of the first embodiment.

As shown in FIG. 3, the above frame member 10 is in the shape of a bar having a substantially C-shaped cross section. The clamping members 20 and 40 are inserted in a center recessed portion of the frame member 10. The clamping member 20 has a plate-like shape and is formed with a plurality of hooks 22. The hooks 22 project in the widthwise direction from the side face of the clamping member 20 so as to be inserted in the slits 93. The hooks 22 are arranged in a spaced relation to one another, so that each hook 22 projects into the grid cell through one of a pair of the slits 93 arranged along the longitudinal direction of the strap 95. As shown in FIGS. 4 and 5, the end portion of the hook 22 is bent in a longitudinal direction of the clamping member 20 (left direction in FIGS. 4 and 5) so as to construct a finger. A plurality of cutouts 24 are formed adjacent to the hooks 22, and are disposed at the side of the fingers of the hooks 22.

The other clamping member 40 has a bar-shaped configuration having a square cross section. Similarly in the clamping member 20, the clamping member 40 is formed with a plurality of hooks 42 which project in the widthwise direction from the side face thereof so as to be inserted in the slits 93. The hooks 42 are arranged in a spaced relation to each other so that each hook 42 projects into the grid cell through one of the pair of the slits 93 arranged along the longitudinal direction of the strap 95. As shown in FIGS. 4 and 5, the front end portion of the hook 42 is bent toward another direction of the longitudinal direction (left direction in FIGS. 4 and 5) so as to construct a finger. A plurality of cutouts 44 are formed adjacent to the hooks 42 and are disposed at the side of the fingers of the hooks 42.

As shown in FIGS. 2 through 4, a pair of the clamping members 20 and 40 are inserted in a contact relation to each other in the center recessed portion of the frame member 10. In this condition, the ends of the hooks 22 and 42 of the clamping members 20 and 40 are facing each other in plan view, and the cutouts 24 and 44 coincide with each other. Moreover, at side ends of the clamping members 20 and 40, there are provided with levers 25 and 45, respectively, for moving the clamping members 20 and 40 in the longitudinal direction thereof, i.e., the longitudinal direction of the outer strap 95.

Furthermore, the apparatus is provided with a plurality of lifting means 30 for moving the clamping members 20 and 40 in a direction away from and toward the outer strap 95, i.e., away from and toward the inner portion of the center recessed portion of the frame member 10 (left and right direction in FIG. 3).

The lifting means 30 consists of a through hole 11, a shaft 31 inserted in the through hole 11, and a lever 32 fixed at an end of the shaft 31. As shown in FIG. 3, the through hole 11 extends from the upper face of the frame member 10 to the lower face thereof through the center recessed portion in which the clamping member 20 and 40 are inserted. The through holes 11 are arranged such that, when the apparatus is attached to the outer strap 95 as shown in FIG. 1, each hole 11 faces the spring 92 of the outer strap 95 and overlaps with the cutouts 24 and 44 of the clamping members 20 and 40.

Figure 5A:
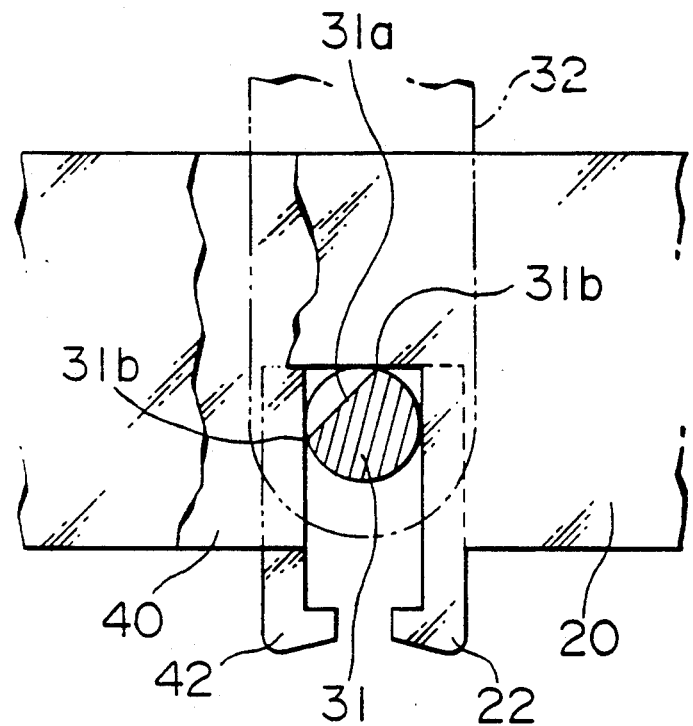
FIGS. 5a and 5b are partial enlarged views of a portion of the axis of the lifting means of the first embodiment.
Figure 5B:
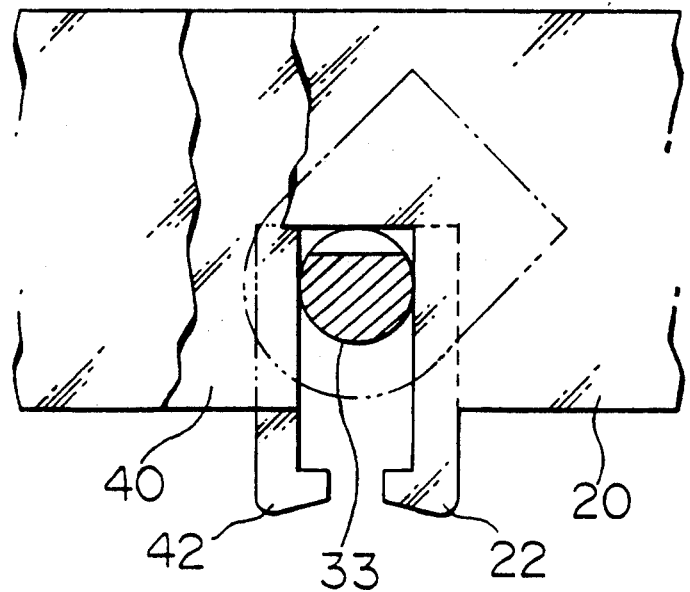

As shown in FIG. 5(a), the shaft 31 inserted in the through hole 11 is formed with a flat portion 31a on the outer peripheral surface thereof at its intermediate portion so as to construct a cam mechanism cooperating with the cutouts 24 and 44. For this cam mechanism, when the shaft 31 is rotated, the intersection 31b between the flat portion 31a and the cylindrical portion of the shaft 31 pushes the bottom wall of the cutouts 24 and 44 of the clamping members 20 and 40, so that the clamping members 20 and 40 are moved toward the inner portion of the center recessed portion of the fame member 10. On the other hand, stopper shafts 33 are inserted in the frame member 10 at a position indicated by symbols "A" as shown in FIG. 1. As shown in FIG. 5(b), the stopper shaft 33 is received in the cutouts 24 and 44 of the clamping members 20 and 40. By virtue of the stopper shaft 33, the movements in the longitudinal direction of the clamping members 20 and 40 are restricted and the distances from the hooks 22 and 42 facing each other to the center axis of the shaft 31 are equal to each other when the hooks 22 and 42 are opened or closed. For this construction, the clamping members 20 and 40 can move in the distance between the diameter of the stopper shaft 33 and width of the cutouts 24 and 44.

As shown in FIG. 3, the levers 32 fixed to the shafts 31 constructing cam mechanisms are connected to each other by a connecting plate 50. The connecting plate 50 is in the shape of a planar plate and is fitted in the frame member 10 in sliding relation so as to slide in the longitudinal direction. As shown in FIG. 2, viewed from the rear of the apparatus, the connecting plate 50 is formed with a plurality of elongated holes 52 through which each lever 32 passes. For this construction, the levers 32 rotate all together in the same direction and in a restricted angle. As shown in FIGS. 2 and 3, the connecting plate 50 is attached with a pair of screws 16. The screws 16 passes through elongated holes 15 formed at the vicinity of the opposite ends of the rear face of the frame member 10. For this construction, the connecting plate 50 can slide in a restricted distance.

In FIG. 3, numerals 10P and 40P indicate holes formed in the frame member 10 and the clamping members 20 and 40 respectively. These holes 10P and 40P are used for inserting a key 99 into a grid cell through an opening 96 formed on the outer strap 95 and an opening 97 formed on the inner strap 91 into inner grid cell. For this construction, by operating the end of the key 99 projecting from the holes 10P and 40P, the springs of the straps forming the inner grid cells can be reflected in a manner similar to that in the prior art.

Figure 6:
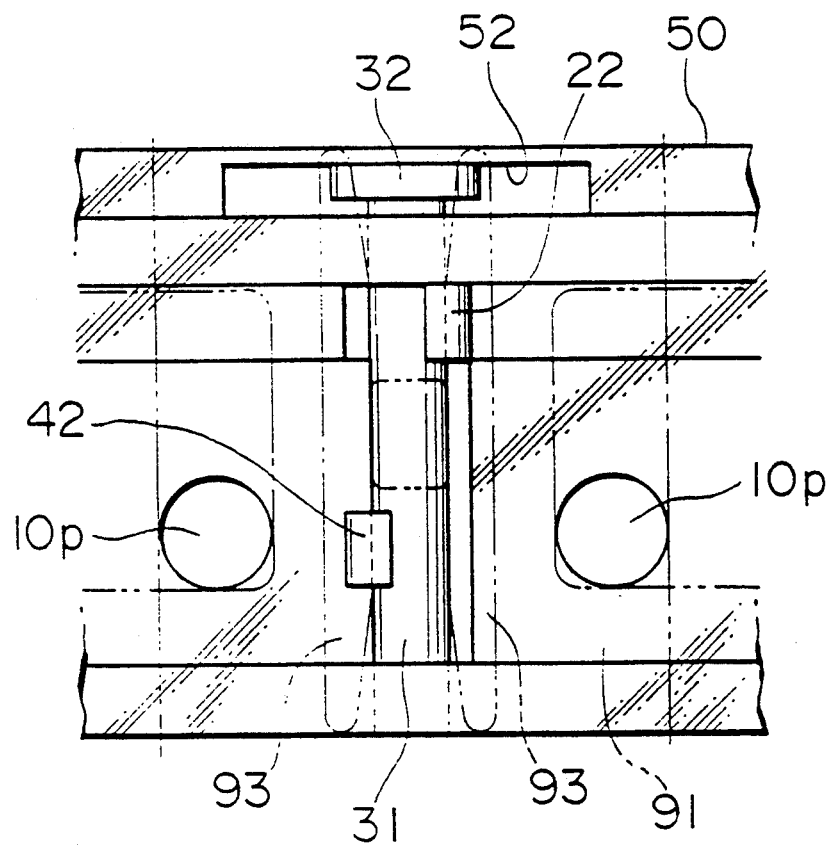
FIG. 6 is a front view showing the apparatus attached to a strap.

In the apparatus constructed as above, the fuel rod 87 as shown in FIG. 16 is inserted in the grid 90 as follow. The apparatus is attached to a peripheral surface of the grid 90. In this operation, since the hooks 22 and 42 of a pair of the clamping members 20 and 40 are arranged at a constant distance such that the hooks 22 and 42 face the slits 93 of the outer strap 95 respectively, the hooks 22 and 42 projecting from the frame member 10 are inserted in the slits 93, as shown in FIG. 6 showing the front face of the grid 90 viewed from the inside thereof.

Then, a pair of the clamping members 20 and 40 are moved toward opposite directions by operating the levers 25 and 45 provided at ends thereof. In this operation, since the front ends of the hooks 22 provided on the clamping member 20 are bent in one longitudinal direction of the outer strap 95, while the front ends of the hooks 42 provided on the clamping member 40 are bent in another longitudinal direction of the outer strap 95, the clamping members 20 and 40 are moved so that the hooks 22 and 42 are into proximity with each other. For this operation, the front ends of the hooks 22 and 42 hold the stem portions of the springs 92 formed between the slits 93, so that springs 92 are held by the clamping members 20 and 40.

Then, the levers 32 of the lifting means 30 is rotated in a direction by operating the connecting plate 50. For this operation, since the shaft 31 attached to the lever 32 is formed with the cam mechanism at the peripheral surface thereof, the bottom walls of the cutouts 24 and 44 of the clamping members 20 and 40 are pushed by the cam mechanism of the shaft 31 toward the inner portion of the center recessed portion of the frame member 10, so that the clamping members 20 and 40 move toward the inner portion of the center recessed portion with respect to the frame member 10. That is, the clamping members 20 and 40 holding the spring 92 by the hooks 22 and 42 move toward the outside of the grid 90 to which the frame member 10 is attached. For this operation, the spring 92 of the outer strap 95 is pressed and reflected so that the space of the grid cell disposed at the peripheral portion of the grid 90 is enlarged. Therefore, the fuel rod 87 can be smoothly inserted into the grid cell without any scratching.

Thus, the apparatus is provided with shafts 31 having the cam mechanism of the lifting means 30. Furthermore, the levers 32 fixed to the shafts 31 are inserted in the elongated holes 52 of the connecting plate, so that the shafts 31 simultaneously all rotate together. Therefore, the clamping members 20 and 40 can be moved in parallel with respect to the strap 91 to which the frame 10 is attached.

FIGS. 7 through 13 show a second embodiment of the present invention. The same numerals are attached to the same components as in the first embodiment to avoid repetition of explanation.

Figure 7:
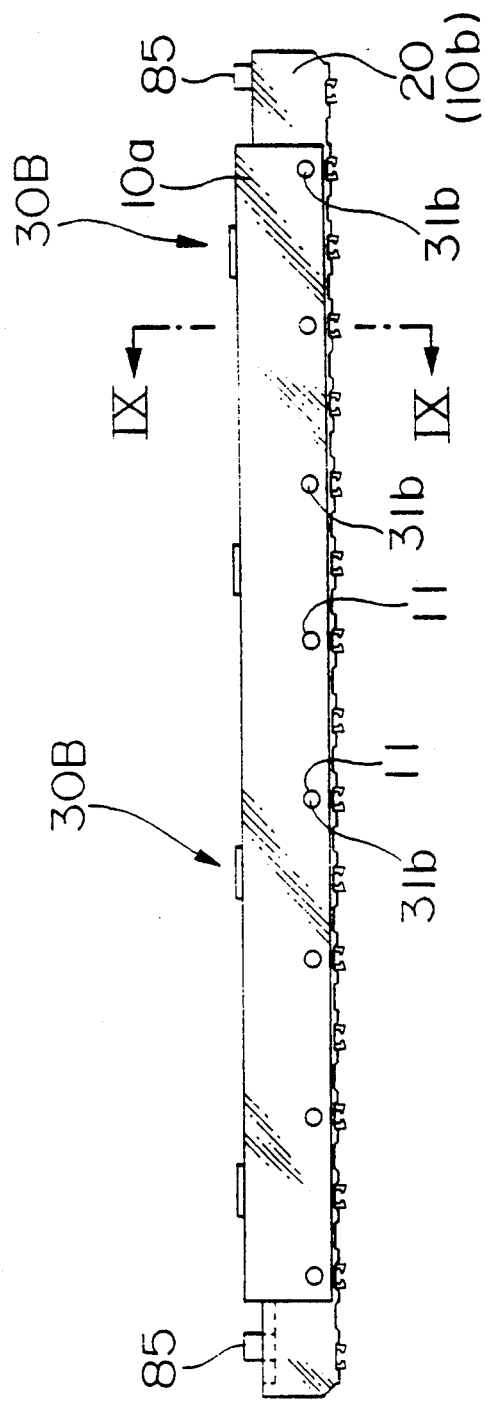
FIG. 7 is a plan view a second embodiment of an apparatus for supporting springs of a grid.
Figure 9:
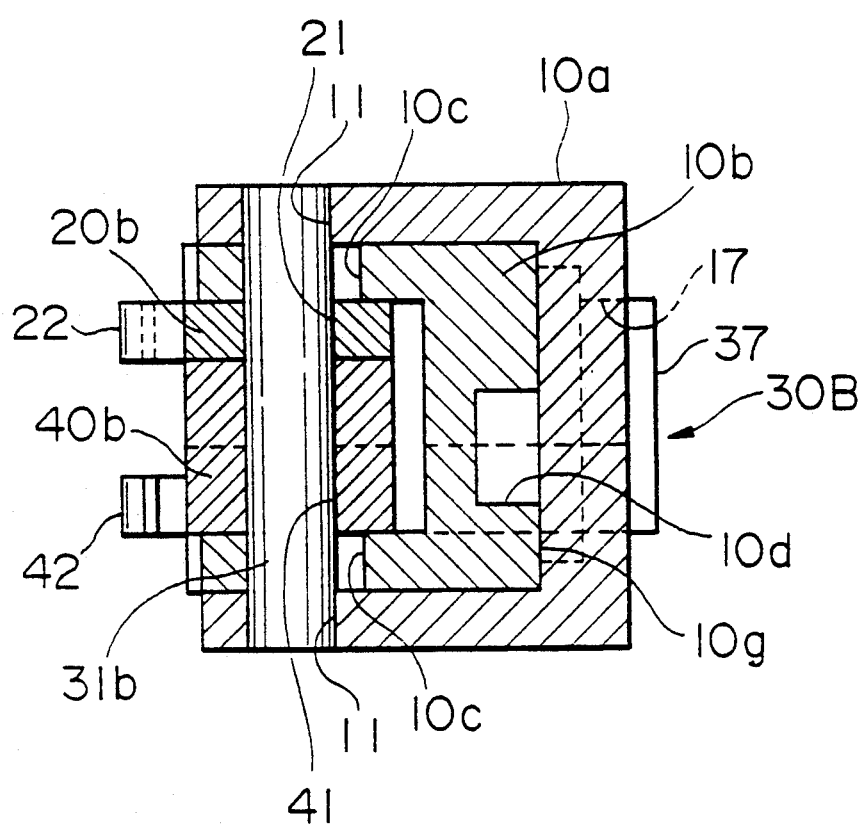
FIG. 9 is a view as viewed from the arrows IX—IX in FIG. 7.

In the second embodiment, as shown in FIG. 9 showing a view seen from the arrows IX—IX in FIG. 7, the apparatus consists of an outer frame 10a, an inner frame 10b inserted in the outer frame 10a, a pair of clamping members 20b and 40b inserted in the inner frame 10b, and a lifting means 30B adapted to move the clamping members 20b and 40b with respect to the outer strap 95.

This embodiment includes the outer frame 10a and the inner frame 10b instead of the frame member 10 in the first embodiment. The outer frame 10a is in the shape of a bar having substantially a C-shaped cross section. The inner frame 10b is in the shape of a bar having substantially a C-shaped cross section. The inner frame 10b is inserted in the outer frame 10a. As shown in FIGS. 7 and 9, the outer frame 10a is formed with a plurality of through holes 11 (eight holes are shown in the figure) having circular cross section. The through hole 11 extends to the center recessed portion of the outer frame 10a from the upper face and the lower face thereof. A shaft 31b having a circular cross section is inserted in the through holes 11 through the clamping members 20b and 40b. The shaft 31b is employed for engaging the inner frame 10b and the clamping members 20b and 40b.

Figure 8:
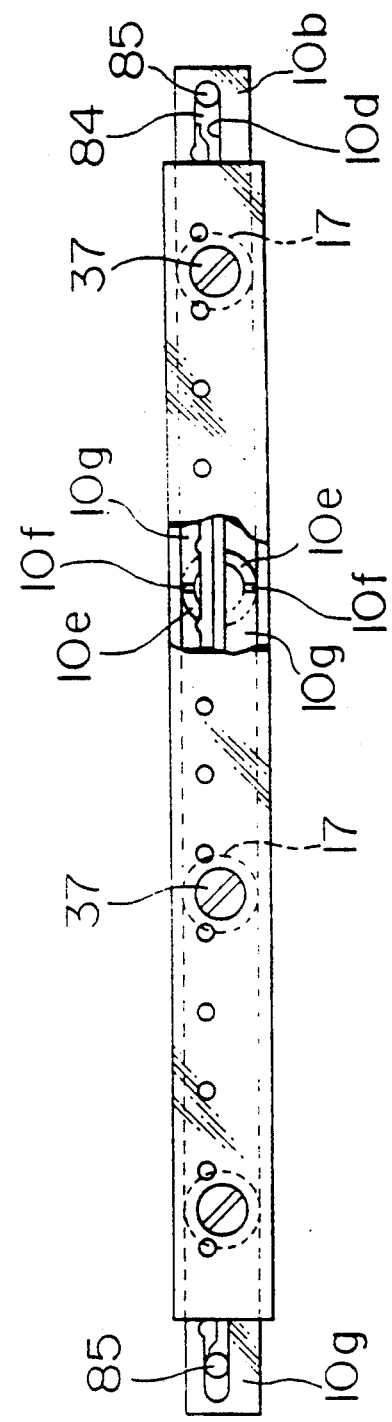
FIG. 8 is a rear view of the second embodiment of an apparatus for supporting springs of a grid.

As shown in FIG. 8 showing a rear view of the apparatus, a plurality of stepped holes 17 (four stepped holes shown in the figure) are formed on the rear face of the outer frame 10a. The diameter of the outer portion of the stepped hole 17 is smaller than the diameter of the inner portion thereof. A rotatable key 37 constructing a part of a lifting means 30B is installed in the stepped hole 17. As shown in FIGS. 7 and 8, the longitudinal length of the outer frame 10a is shorter than the length of the inner frame 10b inserted in the outer frame 10a. Therefore, the opposite ends of the inner frame 10b project from the ends of the outer frame 10a. Numeral 84 indicates an engaging member for engaging the key 99 mentioned in the background of the invention. The engaging member 84 is supported by the inner frame 10b in a sliding relation toward the longitudinal direction thereof. After operating (rotating) the key 99 for pressing and bending the spring 92, the key 99 is engaged with the engaging member 84 by sliding the engaging member 84. Numeral 85 indicates a lever for sliding the engaging member 84.

Figure 12:
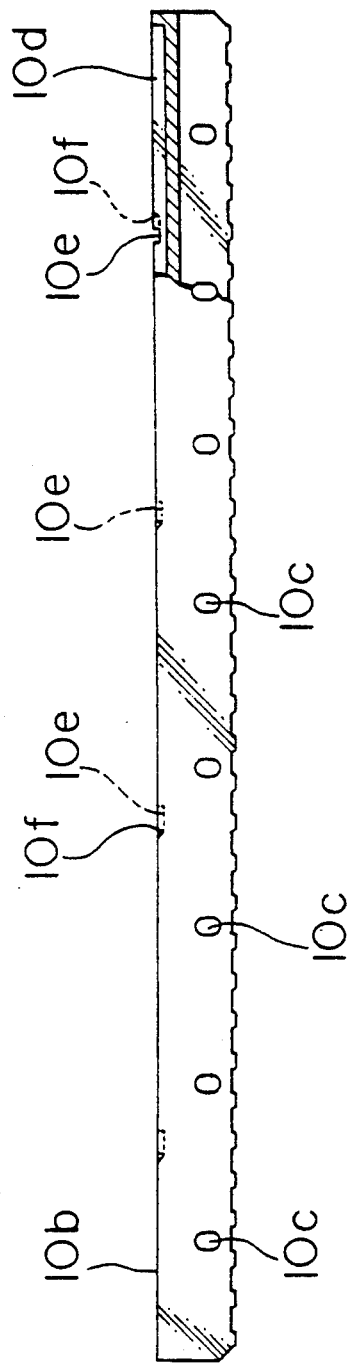
FIG. 12 is a plan view of the inner frame of the second embodiment.

The inner frame 10b is employed for pressing the outer surface of the outer strap 95 when the spring 92 is pressed by the clamping members 20b and 40b which are relatively moved with respect to the inner frame 10b. The inner frame 10b is formed with a plurality of elongated holes 10c. The elongated hole 10c extends from the upper face and the lower face of the inner frame 10b to the center recessed portion thereof. As shown in FIGS. 9 and 12, the major axis of the elongated hole 10c is directed to the widthwise direction of the outer strap 95 so as to allow the relative movement of the outer frame 10a and the clamping members 20b and 40b in the widthwise direction with respect to the inner frame 10b. The inner frame 10b is formed with a groove 10d on the rear face 10g thereof. The groove 10d extends along an entire length of the inner frame 10b in the longitudinal direction. The engaging member 84 for the key 99 is inserted in the groove 10d in a sliding relation toward the longitudinal direction, as mentioned above.

As shown in FIG. 8, a pair of grooves 10e are formed on the rear face 10g of the inner frame 10b. The groove 10e has a substantially ¼ circular shape. The groove 10e is connected to the rear face 10g of the inner frame 10b via an inclined face 10f. The grooves 10e and the inclined face 10f are disposed symmetrically about the center thereof. The position of the center of the grooves 10e is coincident with the center of the step hole 17, as shown in the partially broken portion in FIG. 8.

Figure 10:
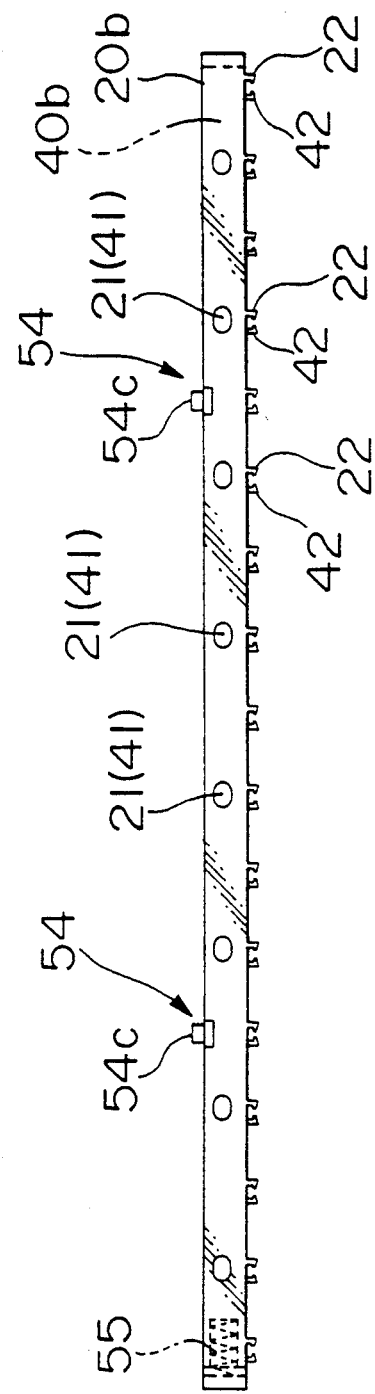
FIG. 10 is a plan view of a pair of clamping members of the second embodiment.
Figure 11:
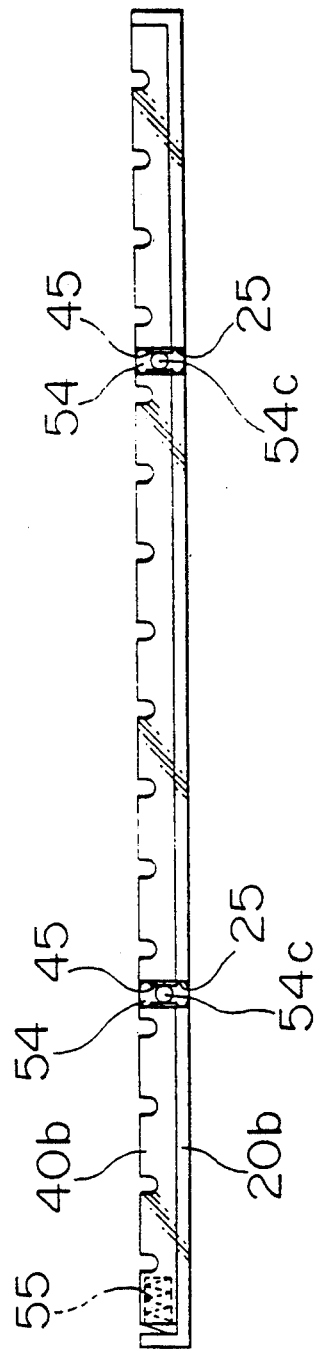
FIG. 11 is a rear view of a pair of clamping members of the second embodiment.

The assembly of the clamping members 20b and 40b is shown in FIG. 10 as a plan view, and FIG. 11 as a rear view. The clamping member 20b corresponds to the clamping member 20 in the first embodiment, and the clamping member 40b corresponds to the clamping member 40 in the first embodiment.

In this embodiment, a means for accurately restricting the distance of the movement of the clamping members 20b and 40b in the opposite directions is provided. That is, as shown in FIG. 11, the opposite ends of the clamping member 20b are perpendicularly bent with respect to the longitudinal direction thereof. The clamping member 40b is received between the opposite ends of the clamping member 20b leaving a certain distance therefrom, so that the clamping member 40b can relatively move in the longitudinal direction in the certain distance. The certain distance corresponds to the distance of the movement of the hooks 22 and 42 formed on the clamping members 20b and 40b. The distance of the movement is sufficient to change the positions of the hooks 22 and 42, in which hooks 22 and 42 are inserted in the slits 93 of the outer strap 95 shown in FIG. 15 and hooks 22 and 42 hold the spring 92 by bringing the hooks 22 and 42 into proximity with each other.

The clamping member 40b is pushed toward one end thereof by a spring 55 mounted between the ends of the clamping members 20b and 40b. The spring 55 maintains the distance between a pair of the hooks 22 and 42 in the condition in which the spring 92 can be held thereby. In addition, as shown in FIGS. 9 and 10, the clamping members 20b and 40b are formed with a pair of elongated holes 21 and 41. The major axis of the elongated holes 21 and 41 are directed to the longitudinal direction, and the elongated holes 21 and 41 overlap each other when the clamping member 40b is pushed by the spring 55 as shown in FIGS. 10 and 11. The elongated holes 21 and 41 also overlap the through hole 11 of the outer frame 10a and the elongated holes 10c of the inner frame 10b as shown in FIG. 7 and 9. The length of the elongated holes 21 and 41 are sufficient to allow the relative movement of the clamping members 20b and 40b in the longitudinal direction with respect to each other.

Furthermore, as shown in FIGS. 10 and 11, a pair of link members 54 are attached on the rear faces of the clamping members 20b and 40b to develop the accuracy of the opposite movements of the clamping members 20b and 40b in the longitudinal direction. The opposite ends of the link member 54 are of arcuately convex shape projecting in the longitudinal direction of the clamping members 20b and 40b. The link member 54 is rotatable around the axis 54c in a certain angle and is inserted in recesses 25 and 45 formed on the rear faces of the clamping members 20b and 40b. The widths of the recesses 25 and 45 are slightly greater than the width of the link member 54. For this construction, the clamping members 20b and 40b can be moved in the same distance toward the longitudinal direction with respect to the inner frame 10b.

In this embodiment, the lifting member 30B adapted to move the clamping members 20b and 40b consists of the rotatable key 37 mounted on the outer frame 10a, the groove 10e and the inclined face 10f formed on the rear face 10g of the inner frame 10b, and the elongated hole 10c formed in the inner frame 10b.

Figure 13:
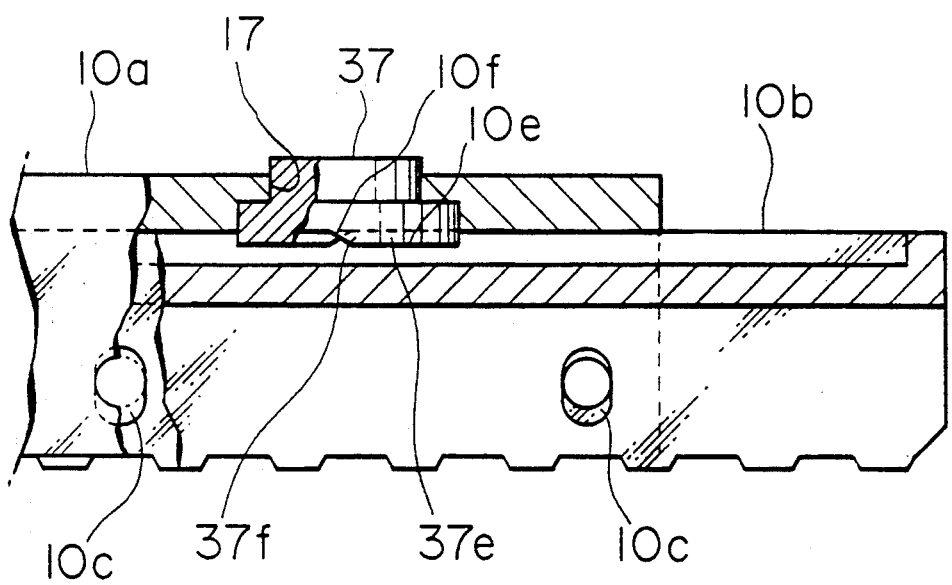
FIG. 13 is a plan view of a principal portion of a cam constructed with an inner frame and a rotatable key.
Figure 14:
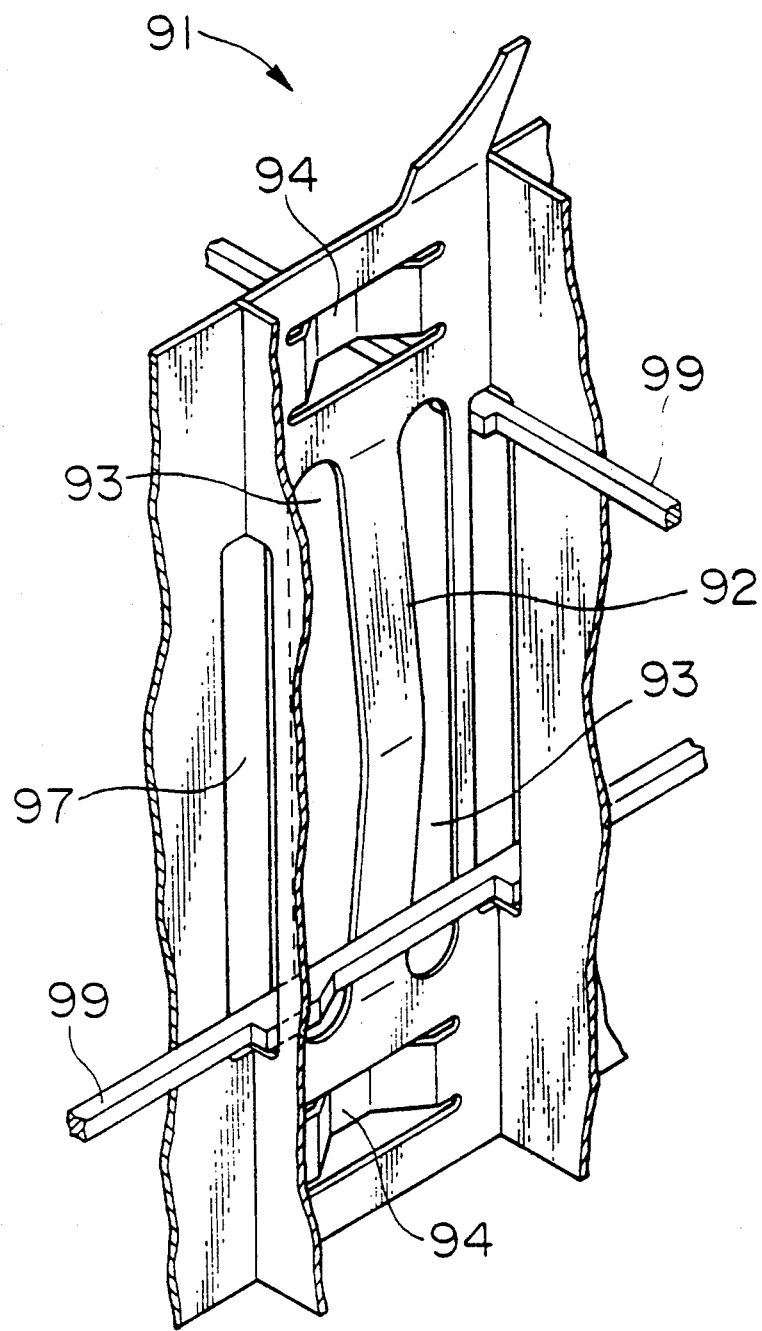
FIG. 14 is a perspective view of straps constructing the grid.

In the lifting means 30B, as shown in FIG. 13, the rotatable key 37 is in the shape of a circular plate having a stepped peripheral outer surface, in which the diameter of the end projecting from the outer frame 10a is smaller than the diameter of the opposite end thereof, so that the rotatable key 37 is rotatably fitted in the stepped hole 17. The peripheral portion of the front face of the rotatable key 37 is formed with a pair of protrusions 37e having circular shape and a pair of inclined faces 37f. The protrusions 37e and the inclined faces 37f are symmetrically arranged about the axis of the rotatable key 37. The protrusions 37e and the inclined faces 37f fit the groove 10e and the inclined faces 10f of the inner frame 10b so as to construct a cam mechanism. That is, the protrusions 37e of the rotatable keys 37 usually contact the groove 10e of the inner frame 10b, and when the rotatable key 37 is rotated, the inclined faces 37f of the rotatable key 37 slide on the inclined faces 10f of the inner frame 10b, and then ride on the rear face 10g of the inner frame 10b, so that the rotatable key 37 pushes and moves the inner frame 10b toward axial in a direction away from the outer frame 10a.

In the apparatus constructed as above, the space of the grid cell is enlarged as mentioned below. At first, the apparatus is attached to the outer strap 95 of the grid in a manner to that in the first embodiment, then the hooks 22 and 42 of the clamping members 20b and 40b are inserted in the slits 93 of the outer strap 95 shown in FIG. 15.

As shown in FIGS. 10 and 11, the clamping member 40b disposed between the opposite ends of the clamping member 20b is usually pushed toward an end of the clamping member 20b by the spring 55, so that the distance between a pair of the hooks 22 and 42 facing each other in plan view is narrower than the slits 93. Therefore, prior to the inserting the hooks 22 and 42, the clamping member 40b must be moved toward another end of the clamping member 20b. When the clamping member 40b is moved against the pushing force of the spring 55, the link members 54 rotate around the axes 54c thereof and another clamping member 20b also moves toward the counter direction of the movement of the clamping member 40b. In order to ensure the above movement of the clamping members 20b and 40b, the axis 54c of the link member 54 is preferably immovable in the longitudinal direction. Therefore, the axis 54c may be rotatably supported by the inner frame 10b allowing the relative movement in a direction away from and toward the inner frame 10b.

The distance of the relative movement between the clamping members 20b and 40b can be restricted by the opposite ends of the clamping member 20b. Therefore, the clamping members 20b and 40b can be relatively moved in a distance defined by the space between clamping members 20b and 40b. Otherwise, the distance of the relative movement between the clamping members 20b and 40b is restricted by the shaft 31b engaging the clamping members 20b and 40b. That is, the clamping members 20b and 40b are provided with the elongated holes 21 and 41 penetrated by the shaft 31b, so that the clamping members 20b and 40b can move in a distances corresponds to the difference between the diameter of the shaft 31b and the lengths of the elongated holes 21 and 41.

The distance of the relative movement of the clamping members 20b and 40b corresponds to the difference between the pitch of the hooks 22 and 42 holding the spring 92, and the pitch of hooks 22 and 42 inserted in the slits 93 and releasing the spring 92. By moving the clamping members 20b and 40b, the positions of the hooks 22 and 42 can be made to coincide with the positions of the slits 93.

After inserting the hooks 22 and 42 in the slits 93 in a manner such as the above, by releasing the pushing force exerted on the clamping member 40b, the clamping member 40b is moved by the spring 55 and returns to the former condition, so that the pitch between the hooks 22 and 42 become smaller, and the spring 92 of the outer strap 95 is held by the hooks 22 and 42.

Then, the rotatable keys 37 attached on the outer frame 10a are rotated ¼ revolution to press the spring 92 of the outer strap 95. In this operation, by virtue of the cam mechanism provided between the front face of the rotatable key 37 and the rear face 10g of the inner frame 10b, when the rotatable key 37 is rotated, the inner frame 10b is pushed toward the outer surface of the strap 91 due to the operation of the cam mechanism. For this operation, since the major axes of the elongated holes 10c are directed to the inner portion of the center recessed portion of the outer frame 10a, the inner frame 10b relatively moves with respect to the outer frame 10a, so that the inner frame 10b projects from the outer frame 10a.

That is, since the outer frame 10a and the clamping members 20b and 40b are immovably fixed by the shaft 31b in a direction away from and toward the outer strap 95, and the outer strap 95 is attached to the grid, the clamping members 20b and 40b holding the springs 92 are moved away from the outer strap 95, i.e., the outward direction of the grid 90, so that the springs 92 are pressed and reflected.

Moreover, since a plurality of the lifting means 30B are provided to the apparatus, and the number of the hooks 20b and 40b is no less than the number of the slits 93 on the outer strap 95, all the springs 92 on the outer strap 95 can be pressed at a time by operating the lifting members 30B in sequence or simultaneously, and all the spaces at a peripheral portion of the grid can be enlarged, so that the fuel rods 87 can be easily inserted in the grid cells.

As mentioned above, the apparatuses include frame member 10 (inner frame 10b) adapted to be attached to the outer strap 95 of the grid 90 along the longitudinal direction of the outer strap 95, and a pair of the clamping members 20 and 40 (20b and 40b) which are inserted in the frame member 10 (inner frame 10b) and extending and moveable in the longitudinal direction. Furthermore, the clamping members 20 and 40 (20b and 40b) are provided with a plurality of projecting hooks 22 and 42 which are arranged in a spaced relation to each other and facing to the slits 93 of the outer strap 95. Moreover, the ends of the hooks 22 of one of the clamping members 20 (20b) are bent in a longitudinal direction of the outer strap 95, and other hooks 42 of another clamping members 40 (40b) are bent in another longitudinal direction of the outer strap 95. For this construction, by just inserting the hooks 22 and 24 in the slits 93 and moving a pair of the clamping members 20 and 40 (20b and 40b) in the longitudinally opposite directions, all the springs 92 of the outer strap 95 of the grid 90 can be held simultaneously.

Furthermore, the apparatuses include the lifting means 30 (30B) for relative moving of the clamping members 20 and 40 (20b and 40b) with respect to the frame member 10 (inner frame 10b) in a direction away from and toward the outer strap 95, all the springs 92 can be pressed and bent simultaneously, so that the spaces of the grid cells at a peripheral portion of the grid 90 can be easily and quickly enlarged.

The present invention is not restricted in the above embodiment, and other variations can be applied within the scope of the invention.

What is claimed is:

1. An apparatus for pressing and holding springs of grid constructed with a plurality of straps in a form of elongated sheets, said strap having a pair of slits extending in the widthwise direction of the strap and a spring formed between the slits, a plurality of said slits and said spring being arranged continuously in the longitudinal direction of the strap, said apparatus comprising:

a frame member adapted to be attached to the strap along the longitudinal direction thereof;

a pair of clamping members engaged said frame member and extending in the longitudinal direction of the strap, each said clamping member being capable of moving along the longitudinal direction of the strap;

said clamping member having a plurality of projecting hooks arranged toward the longitudinal direction of the strap in a spaced relation to one another;

said hooks provided to one of said clamping members having ends respectively, said ends being bent in a longitudinal direction of the strap;

said hooks provided to one of said clamping members having ends respectively, said ends being bent in a longitudinal direction of the strap;

said hooks provided to another of said clamping members having ends respectively, said ends being bent in another longitudinal direction of the strap.

2. An apparatus for pressing and holding a spring of a grid in accordance with claim 1, wherein said apparatus further includes at least a lifting means for relatively moving said clamping members with respect to said frame member in a direction away from and toward said strap.

3. An apparatus for pressing and holding a spring of a grid in accordance with claim 2, wherein said frame member is formed with a recess extending toward the longitudinal direction thereof, and said clamping members are movably inserted in the recess in a direction away from and toward an inner part of the recess.

4. An apparatus for pressing and holding a spring of a grid in accordance with claim 3, wherein said lifting means comprises a shaft rotatably supported by the frame member, said shaft has a cam provided on the peripheral surface thereof, and said cam is engaged said clamping members so as to move the clamping members in a direction away from said strap.

5. An apparatus for pressing and holding a spring of a grid in accordance with claim 4, wherein said clamping members are formed with cutouts adjacent to said hook, and said cam is inserted in the cutouts so as to push a bottom face of the cutouts.

6. An apparatus for pressing and holding a spring of a grid in accordance with claim 2, wherein said apparatus comprises a plurality of said lifting means, said shaft is provided with a lever attached an end thereof for rotating the shaft, and said levers are connected by a connecting member so as to be rotated all together.

7. An apparatus for pressing and holding a spring of a grid in accordance with claim 3, wherein said lifting means comprises a shaft inserted in said frame member and said clamping means and projecting from said frame member, said clamping members are movable toward the longitudinal direction thereof and are immovable in a direction away from and toward said inner part of the recess of the frame member with respect to the shaft, and said shaft is movable in the direction away from and toward the inner part of the recess of the frame member with respect to the frame member.

8. An apparatus for pressing and holding a spring of a grid in accordance with claim 7, wherein said lifting means comprises an outer frame having a recess extending toward the longitudinal direction thereof, said frame member is movably inserted in the recess in a direction away from and toward an inner portion of the recess of the outer frame, and said shaft is attached to the outer frame.

9. An apparatus for pressing and holding a spring of a grid in accordance with claim 8, wherein said lifting means comprises a cam means disposed between said outer frame and said frame member.

10. An apparatus for pressing and holding a spring of a grid in accordance with claim 9, wherein said cam means comprises a circular-shaped rotatable key having a front face and a rear face, said front face is exposed to a bottom face of said recess of the outer frame, said rear face is exposed to a rear face behind said bottom face of the outer frame, said front face of the rotatable key is provided with an inclined face, said frame member has a rear face directed to the bottom face of the recess of the outer frame, and said rear face of the frame member is provided with an inclined face engaging said front face of the rotatable key so as to push the rear face of the rear face of the frame member when the rotatable key is rotated.

* * * * *